United States Patent
Osaka

(10) Patent No.: US 8,301,201 B2
(45) Date of Patent: Oct. 30, 2012

(54) CELLULAR PHONE

(75) Inventor: Masahiko Osaka, Tokyo (JP)

(73) Assignee: NEC Corporation, Tokyo (JP)

( * ) Notice: Subject to any disclaimer, the term of this patent is extended or adjusted under 35 U.S.C. 154(b) by 343 days.

(21) Appl. No.: 12/671,844

(22) PCT Filed: Aug. 12, 2008

(86) PCT No.: PCT/JP2008/064458
§ 371 (c)(1),
(2), (4) Date: Feb. 2, 2010

(87) PCT Pub. No.: WO2009/031388
PCT Pub. Date: Mar. 12, 2009

(65) Prior Publication Data
US 2011/0237300 A1    Sep. 29, 2011

(30) Foreign Application Priority Data
Sep. 3, 2007    (JP) .................. 2007-227756

(51) Int. Cl.
*H04B 1/38* (2006.01)
*H04M 1/00* (2006.01)
*F21V 13/00* (2006.01)
(52) U.S. Cl. .................. 455/566; 455/575.1; 455/575.3; 455/575.4; 362/245; 362/247
(58) Field of Classification Search .................. 455/566, 455/575.1, 575.3, 575.4; 362/245, 247
See application file for complete search history.

(56) References Cited

U.S. PATENT DOCUMENTS 6,254,249 B1 * 7/2001 Kim et al. ...................... 362/109
2004/0041780 A1 * 3/2004 Ko .................................. 345/102

FOREIGN PATENT DOCUMENTS

| JP | 2002056734 A | 2/2002 |
| JP | 2002300270 A | 10/2002 |
| JP | 2002-354096 | * 12/2002 |
| JP | 2002354096 A | 12/2002 |
| JP | 2003069701 A | 3/2003 |
| JP | 2004220113 A | 8/2004 |
| JP | 2006005410 A | 1/2006 |
| JP | 2006129168 A | 5/2006 |

OTHER PUBLICATIONS

International Search Report for PCT/JP2008/064458 mailed Sep. 9, 2008.

* cited by examiner

*Primary Examiner* — Ariel Balaoing

(57) ABSTRACT

A cellular phone of the present invention comprises upper housing 10 and lower housing 20 connected together for displacement relative to each other. Upper housing 10 incorporates liquid crystal unit 30 which includes light source 35 and liquid crystal panel 34 illuminated by light emitted from light source 35. Lower housing 20 incorporates an input device. Upper housing 10 comprises slit 13 which communicates with the interior and exterior of upper housing 10, and light guide means for guiding light emitted from light source 35 to slit 35. Operating unit 21 of the input device arranged on lower housing 20 is illuminated by light which is guided by the light guide means and which is emitted to the outside of upper housing 10 through slit 13.

7 Claims, 7 Drawing Sheets

CELLULAR PHONE

This application is the National Phase of PCT/JP2008/064458, filed Aug. 12, 2008, which claims priority based on Japanese Patent Application No. 2007-227756 filed Sep. 3, 2007, the disclosure of which is incorporated herein by reference in its entirety.

TECHNICAL FIELD

The present invention relates to a cellular phone, and more particularly, to a cellular phone which comprises two or more housings capable of displacement relative to each other.

BACKGROUND ART

Nowadays, cellular phones have become pervasive not only in Japan but also all over the world. Many of currently popularized cellular phones comprise a housing provided with display means and a housing provided with input means, where these housings are coupled such that they are capable of displacement relative to each other. For example, a housing provided with a display device (upper housing) and a housing provided with an input device (lower housing) are coupled through a hinge mechanism such that they can make pivotal movements. More specifically, a liquid crystal display is housed in the upper housing, and a display screen of the display is exposed on a front surface of the upper housing. On the other hand, the input device is incorporated in the lower housing, and input keys, which serve as an interface of the input device, are arranged on a front surface of the lower housing. Then, the upper housing and lower housing are coupled for pivotal movements from a state where the front surfaces thereof oppose each other to a state where both the front surfaces form an angle of approximately 160°. Further, with improvements in functions, some cellular phones which have come on the market comprise two or more housings which can make pivotal movements or sliding movements in various directions.

Here, since cellular phones may be used in dark places, many of them additionally comprise a light source for illuminating input keys from a back side thereof. For example, a known cellular phone incorporates a light source such as a light emitting diode (LED) in a housing which is provided with input keys, at least part of input keys are made of translucent material. In such a cellular phone, since light emitted from the light source passes through the input keys, one can view characters, symbols and the like displayed on the surfaces of the input keys even in dark places.

Also, JP2004-220113A (Document 1) and JP2006-5410A (Document 2) disclose cellular phones which comprise a light source for illuminating input keys from a front side thereof. The cellular phone disclosed in Document 1 comprises a first housing provided with a keyboard unit, a second housing provided with a display unit, and a hinge section for coupling the two housings to allow them to open/close. Additionally, a high-luminance light emitting diode is incorporated within the hinge section. The hinge section further comprises a lens fixed thereto, which comprises a first lens section oriented toward the display unit and a second lens section oriented toward the keyboard unit. Then, when the two housings are open, light emitted from the high-luminance light emitting diode is guided to the keyboard unit by the second lens section, so that the keyboard unit is illuminated from the front side thereof.

The cellular phone disclosed in Document 2 comprises a first housing which has a display panel arranged thereon, and a second housing which has a key operating portion, including a plurality of keys, arranged thereon. These two housings are coupled by a hinge mechanism for rotation relative to each other in the horizontal direction. The first housing is also provided on a side surface with a lighting unit including LED (light emitting diode). Then, the lighting unit functions as a key operating portion illumination light source for illuminating the key operating portion provided to the second housing when the two housings remain open.

DISCLOSURE OF THE INVENTION

Problem to be Solved by the Invention

According to the techniques disclosed in Document 1 and Document 2 described above, even if the interface of the input device such as input keys and key operating portion are not optically transparent, characters, symbols and the like displayed on the surface of the interface can be viewed in dark places. However, the techniques disclosed in Document 1 and Document 2 cause an increase in power consumption because a dedicated light source is required for illuminating the interface. In addition, a space must be reserved for installing the dedicated light source, resulting in an increase in size and thickness of the cellular phone. Moreover, electric wires must be provided for supplying power to the dedicated light source.

It is an object of the present invention to enable a cellular phone to illuminate an interface of an input device from a front side thereof without causing an increase in power consumption or an increase in size of the cellular phone.

Means for Solving the Problems

A cellular phone according to the present invention includes an upper housing and a lower housing which are coupled for displacement relative to each other. The upper housing incorporates a liquid crystal unit including a light source and a liquid crystal panel illuminated by light emitted from the light source. The lower housing incorporates an input device. The upper housing includes a slit communicating with the interior and exterior of the upper housing, and light guide means for guiding light emitted from the light source to the slit. An operating portion of the input device disposed in the lower housing is illuminated by light guided by the light guide means and emitted to the outside of the upper housing through the slit.

Effects of the Invention

According to the present invention, the operating portion of the input device can be illuminated from the front side thereof without causing an increase in power consumption or an increase in size of the cellular phone.

The above and other objects, features, and advantages of the present invention will become apparent from the following description with reference to accompanying drawings which illustrate an example of the present invention.

BEST MODE FOR CARRYING OUT THE INVENTION

Embodiment 1

A cellular phone according to this embodiment comprises a first housing (hereinafter called "upper housing 10") provided with a liquid crystal unit as a display device, and a second housing (hereinafter called "lower housing 20") provided with an input device. Upper housing 10 and lower housing 20 are rotatably coupled by a coupling mechanism.

Figure 2:
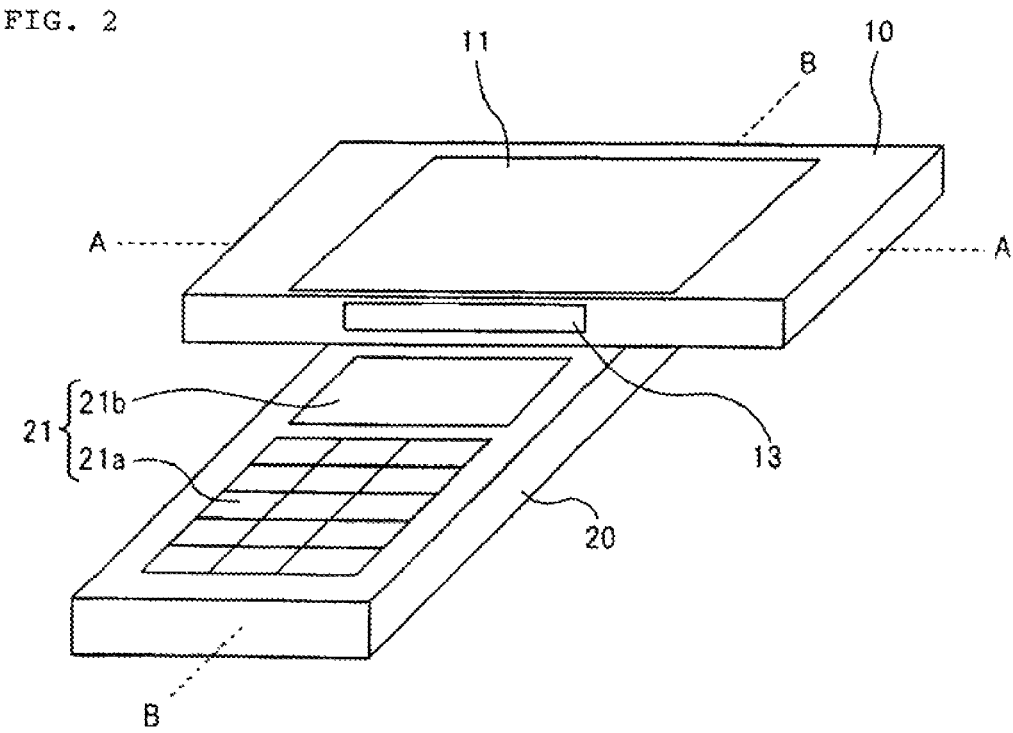
FIG. 2 A perspective view showing a first open state of the cellular phone according to Embodiment 1.
Figure 3:
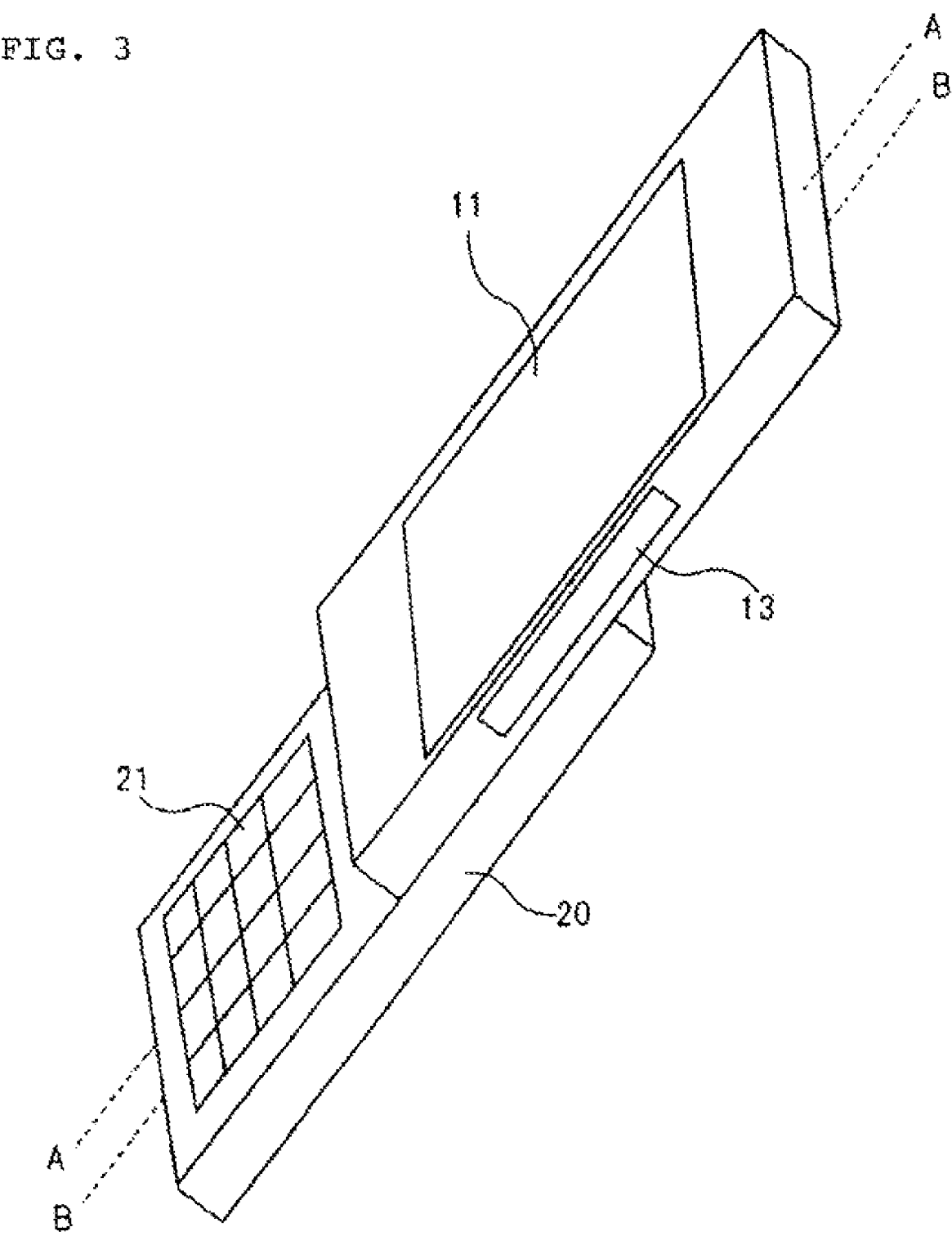
FIG. 3 A perspective view showing a second open state of the cellular phone according to Embodiment 1.

Notably, in the following description, a front surface refers to a surface of upper housing 10 on which a display screen 11 of the liquid crystal unit is exposed, and a rear surface refers to the surface opposite to the front surface. Also, the input device provided in lower housing 20 comprises input keys 21a and input pad 21b (hereinafter collectively called "operating portion 21") as an interface. Accordingly, in the following description, a front surface refers to a surface of lower housing 20 on which operating portion 21 is disposed, and a rear surface refers to the surface opposite to the front surface. For facilitating an understanding, a general description will be given of a coupling state and rotating operation of upper housing 10 and lower housing 20 in accordance with the foregoing definitions with reference to FIGS. 1-3. However, the foregoing definitions are simply made for convenience of description.

Upper housing 10 and lower housing 20 are coupled by a rotation mechanism such that they can shift among from a closed state, a first open state or a second open state to another state. Here, the closed state refers to a state shown in FIG. 1, where substantially the entirety of the front surface of lower housing 20 (at least the area in which the operating portion is disposed) is covered with upper housing 10, and center line A-A of upper housing 10 matches with center line B-B of lower housing 20 on the same straight line. The first open state, in turn, refers to a state shown in FIG. 2, where the disposed area of the operating portion of lower housing 20 exposes, and center line A-A of upper housing 10 is perpendicular to center line B-B of lower housing 20. Further, the second open state refers to a state shown in FIG. 3, where the disposed area of the operating portion of lower housing 20 exposes, and center line A-A of upper housing 10 matches with center line B-B of lower housing 20 on the same straight line.

Specifically, upper housing 10 and lower housing 20 are coupled for rotation 180° at maximum. Notably, upper housing 10 and lower housing 20 rotate in a plane parallel with their respective opposing surfaces (the rear surface of upper housing 10 and the front surface of lower housing 20). Also, center line A-A of upper housing 10 is a straight line which intersects perpendicularly with a shorter side of upper housing 10 and bisects the shorter side. Likewise, center line B-B of lower housing 20 is a straight line which intersects perpendicularly with a shorter side of lower housing 20 and bisects the shorter side.

Figure 4:
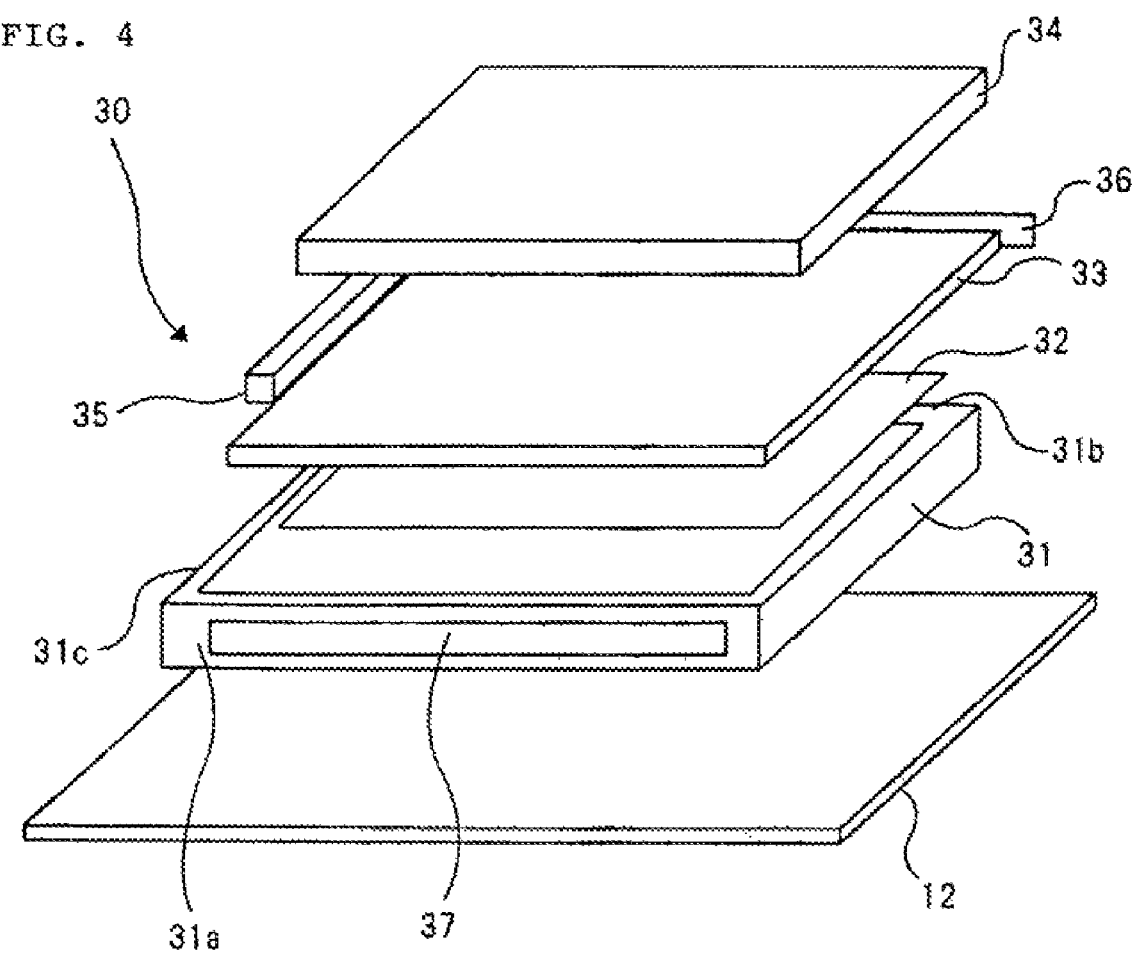
FIG. 4 An exploded perspective view showing a liquid crystal unit installed in the cellular phone according to Embodiment 1.

FIG. 4 is an exploded perspective view showing the structure of liquid crystal unit 30 incorporated in upper housing 10. As shown in FIG. 4, liquid crystal unit 30 is placed on mounting board 12 disposed in upper housing 10. This liquid crystal unit 30 comprises square (rectangular in this embodiment) frame 31, and first reflective sheet 32, diffusion plate 33, and liquid crystal panel 34 which are sequentially laminated within frame 31. First side wall 31a of frame 32 is formed with opening 37 which communicates with the interior and exterior of frame 31. Also, second reflective sheet 36 is disposed between an inner surface of second side wall 31b opposite to first side wall 31a, and a side surface of diffusion plate 33 opposite to the inner surface of second side wall 31b. Further, LED light source 35 is disposed between an inner surface of third side wall 31c perpendicular to first and second side walls 31a, 31b and a side wall of diffusion plate 33 opposite to the inner surface of third side wall 31c.

In liquid crystal unit 30 that has the structure described above, light emitted from LED light source 35 is incident on diffusion plate 33 from a side surface of diffusion plate 33, and is diffused over the entirety of diffusion plate 33. The diffused light is reflected by first reflective sheet 32 toward liquid crystal panel 34 to illuminate liquid crystal panel 34 from a back side thereof. In other words, LED light source 35 functions as a back light for liquid crystal panel 34. Also, part of light diffused into diffusion plate 33 exits from a side surface opposite to opening 37. Further, another part of the light diffused onto diffusion plate 33 exits from a side surface on the opposite side of the side surface opposite to opening 37, and is incident on second reflective sheet 36. The light incident on second reflective sheet 36 is reflected by second reflective sheet 36 and then impinge again on diffusion plate 33, and exits from the side surface opposite to opening 37. In essence, part of light emitted from LED light source 35 illuminates liquid crystal panel 34, while another part is emitted to the outside of frame 31 through opening 37.

Figure 1:
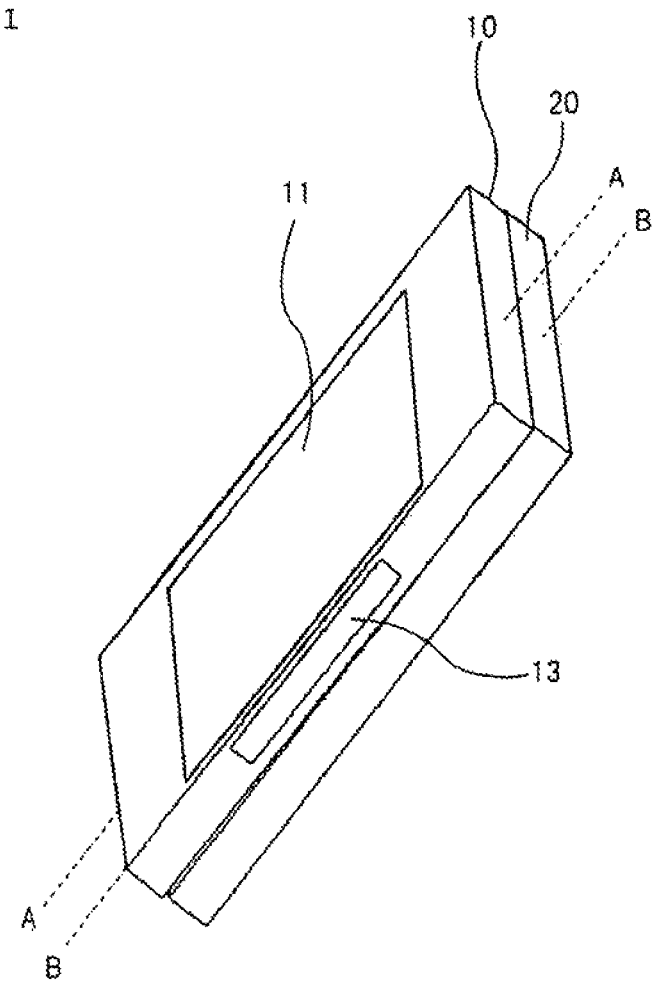
FIG. 1 A perspective view showing a closed state of a cellular phone according to Embodiment 1.

Here, as shown in FIG. 1, slit 13 is formed through the side wall of upper housing 10 opposite to opening 37 of frame 31. Further, the side wall of upper housing 10 formed with slit 13 therethrough is placed on the front surface of lower housing 20 (see FIG. 2) in the first open state. Accordingly, Light emitted from opening 37 in the first open state illuminates the front surface (operating portion 21) of lower housing 20 through slit 13. Notably, slit 13 can be provided with a lens or another optical element for deflecting the light emitted from slit 13 so as to more efficiently illuminate the front surface (operating portion 21) of lower housing 20.

As described above, LED light source 35 functions as a light source for a back light of liquid crystal panel 34, and also functions as a light source to illuminate operating portion 21 disposed on lower housing 20.

Figure 5:
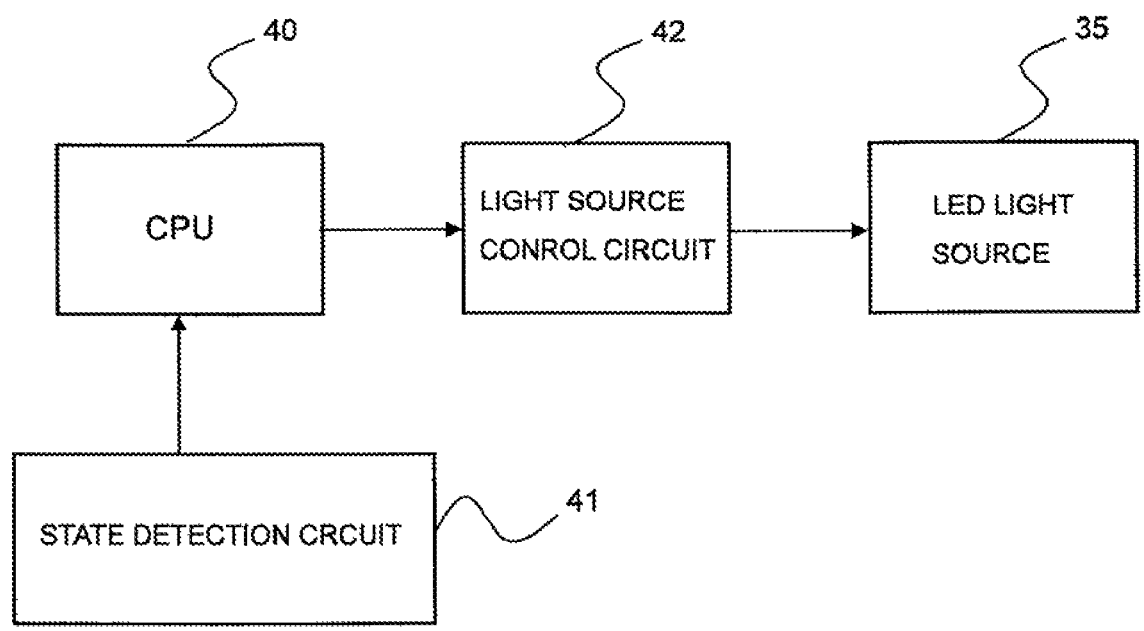
FIG. 5 A block diagram of the cellular phone according to Embodiment 1.
Figure 6:
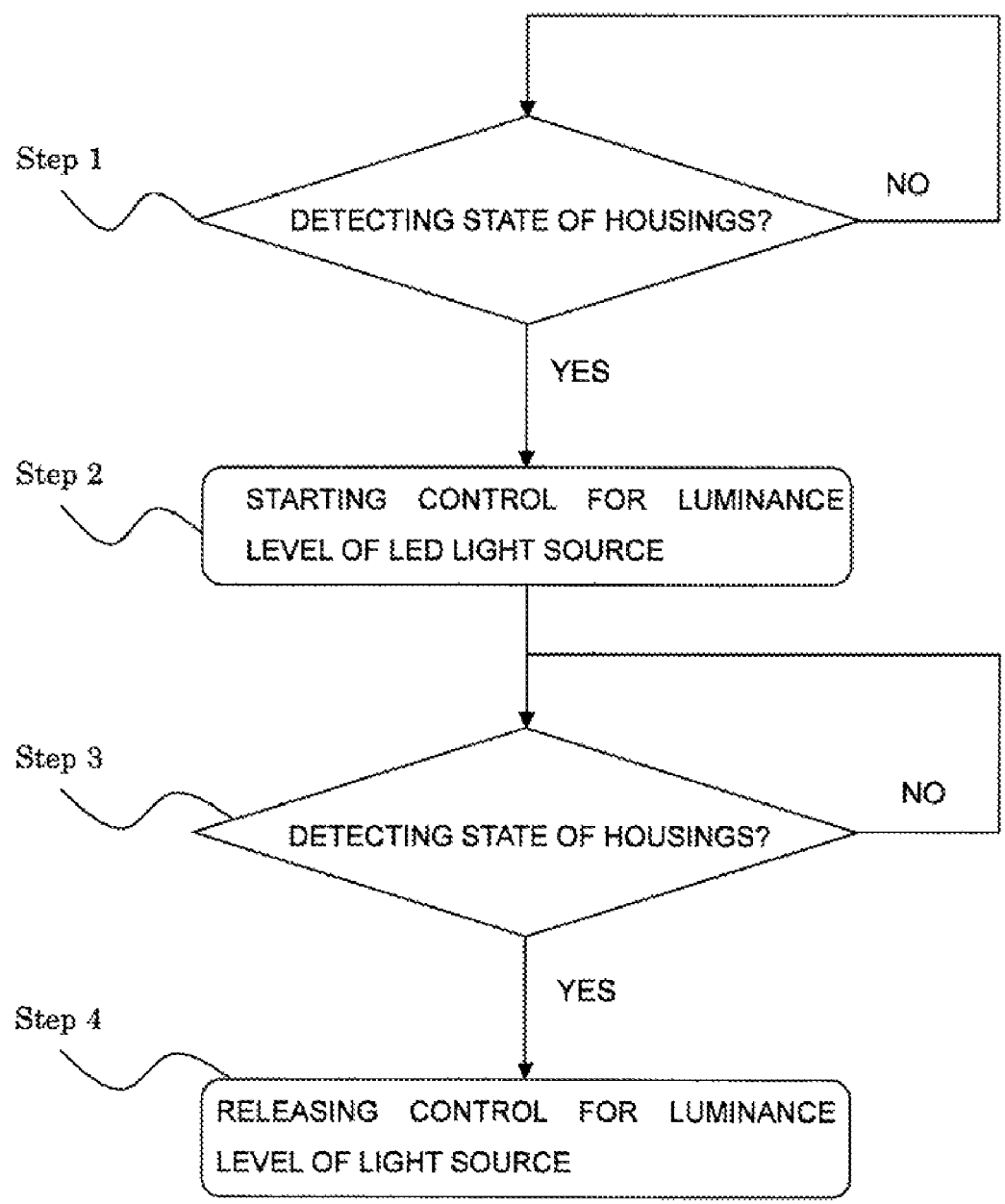
FIG. 6 A flow diagram for controlling a LED light source in the cellular phone according to Embodiment 1.

Next, a description will be given of the control of LED light source 35. As shown in FIG. 5, the cellular phone according to this embodiment comprises CPU 40 for generally controlling the overall phone, state detection circuit 41 for detecting the state of upper housing 10 and lower housing 20, and light source control circuit 42 for controlling LED light source 35. State detection circuit 41 informs CPU 40 of the states of housings 10, 20. For example, state detection circuit 41 outputs a predetermined different signal for each of the closed state, first open state, and second open state to CPU 40. Alternatively, state detection circuit 41 outputs a predetermined signal only when housings 10, 20 are in the first open state. Further alternatively, state detection circuit 41 outputs a predetermined signal when housings 10, 20 are in the closed state and second open state, and stops outputting the signal when housings 10, 20 change to the first open state. In any case, CPU 40 detects that housings 10, 20 are in the first open state, based on a signal applied from state detection circuit 41 or on an interruption of the input signal (Step 1 in FIG. 6).

Upon detection of housings 10, 20 in the first open state, CPU 40 outputs an instruction to light source control circuit 42. Upon receipt of the instruction, light source control circuit 42 controls LED light source 35 in accordance with the instruction (Step 2 in FIG. 6). Specifically, CPU 40 instructs LED light source 35 to emit light at a luminance level higher than usual. Here, normal luminance level refers to luminance level when housings 10, 20 are in the closed state or second open state.

When CPU 40 detects that housings 10, 20 have shifted to a state other than the first open state, based on a signal applied from state detection circuit 41 or on resumption of the applied signal (Step 3 in FIG. 6), CPU 40 outputs an instruction to light source control circuit 42 to stop the light emission at the higher luminance level. Upon receipt of the instruction, light source control circuit 42 turns off LED light source 35 or reduces the luminance level to the normal luminance level (Step 4 in FIG. 6).

Notably, it is not essential to control the luminance level of LED light source 35 in accordance with the state of housings 10, 20. When the luminance level of LED light source 35 is not controlled in accordance with the state of housings 10, 20, state detection circuit 41 shown in FIG. 5 can be omitted.

Alternatively, CPU 40 may control LED light source 35 to turn ON/OFF in accordance with the state of housings 10, 20. Specifically, LED light source 35 is turned ON when housings 10, 20 are shifted to the first open state while LED light source 35 is in OFF state. However, LED light source 35 is also responsible for a light source for a back light of liquid crystal panel 34. Therefore, when liquid crystal panel 34 must be illuminated, LED light source 35 is turned ON irrespective of the state of housings 10, 20. As such, housings 10, 20 can be shifted to the first open state when LED light source 35 is in ON state. In this event, LED light source 35 is maintained in ON state as it is, or the luminance level is increased to a predetermined level.

Embodiment 2

In the following, a description will be given of another embodiment of a cellular phone of the present invention. Nevertheless, the mechanical structure of the cellular phone according to this embodiment is the same as the cellular phone according to Embodiment 1. Accordingly, the following description will focus only on differences with the cellular phone according to Embodiment 1. In the following description, the same reference numerals are used for the same components as those of the cellular phone according to Embodiment 1.

Figure 7:
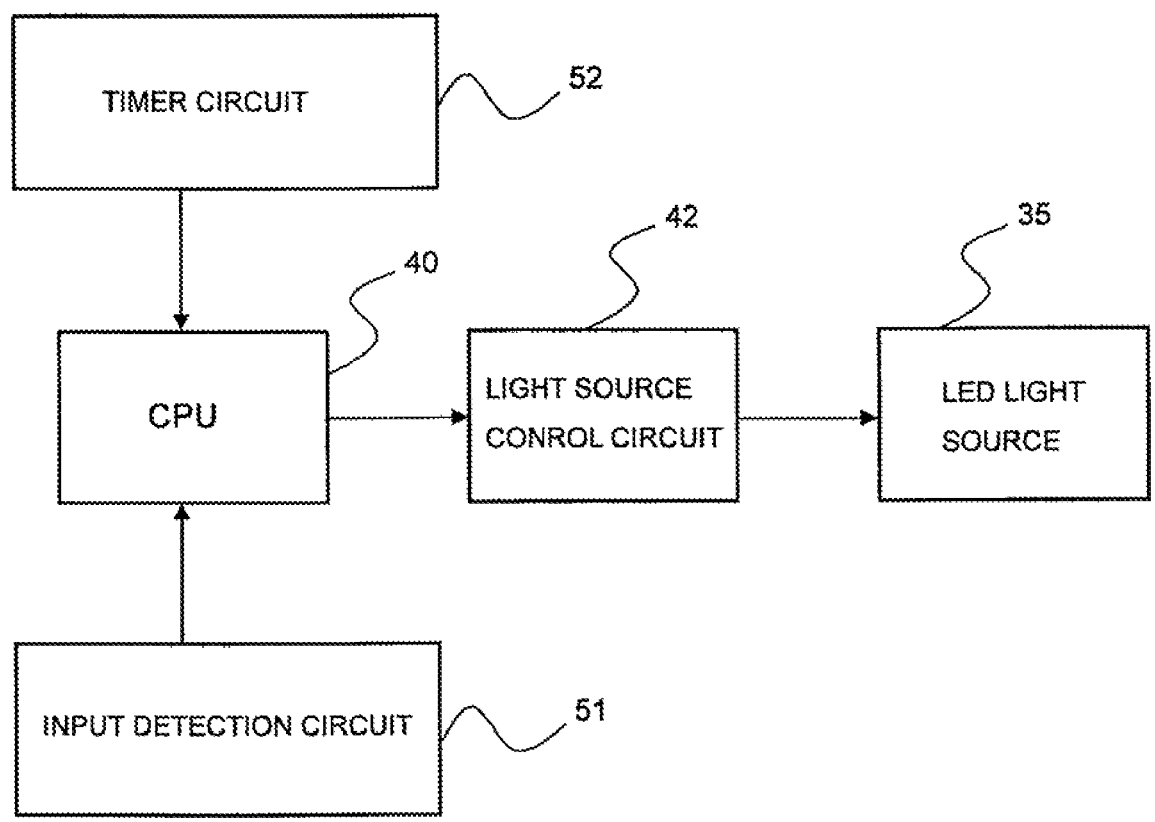
FIG. 7 A block diagram of a cellular phone according to Embodiment 2.
Figure 8:
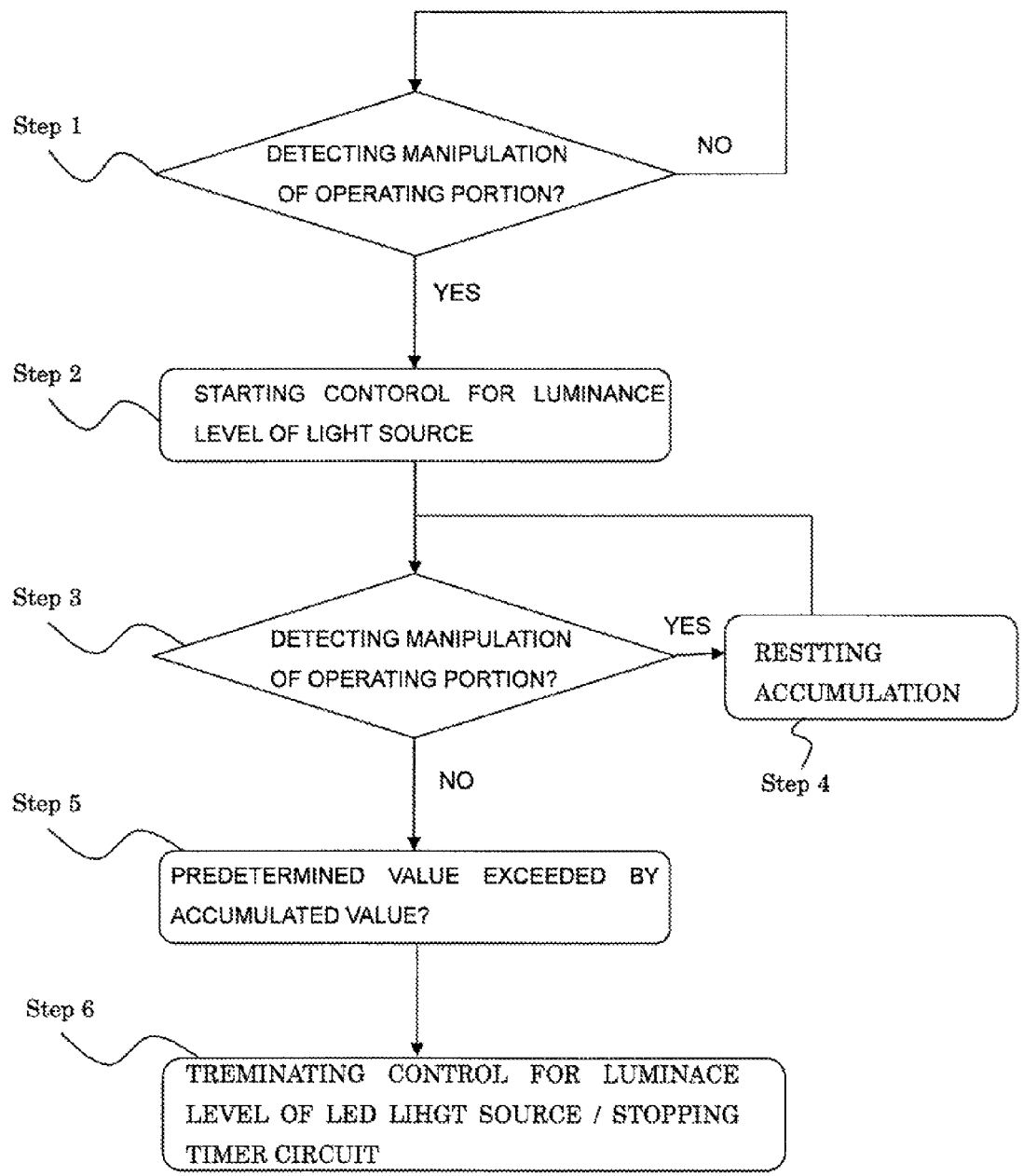
FIG. 8 A flow diagram for controlling a LED light source in the cellular phone according to Embodiment 2.

As shown in FIG. 7, the cellular phone according to this embodiment comprises CPU 40 for generally controlling the overall phone, input detection circuit 51 for detecting whether or not operating portion 21 (FIG. 2) has been manipulated, timer circuit 52, and light source control circuit 42 for controlling LED light source 35. When operating portion 21 has been manipulated, input detection circuit 51 informs CPU 40 of the manipulation. For example, when any input key 21a (FIG. 2) is depressed, input detection circuit 51 outputs a predetermined signal to CPU 40. Alternatively, input detection unit 51 continuously outputs a predetermined signal to CPU 40, and stops outputting the signal when any input key 21a is depressed. In any case, CPU 40 detects that operating portion 21 has been manipulated, based on the signal applied from input detection circuit 51 or on an interrupt of the signal input (Step 1 in FIG. 8).

When CPU 40 detects that operating portion 21 has been manipulated, CPU 40 starts up timer circuit 52, and outputs an instruction to light source control circuit 42. The started timer circuit starts accumulation of count. On the other hand, light source control circuit 42, upon receipt of the instruction, increases the luminance level of LED light source 35 in accordance with the instruction (Step 2 in FIG. 8).

Afterwards, as the integrated value of timer circuit 52 reaches a predetermined value (Step 5 in FIG. 8), CPU 40 outputs instructions to light source control circuit 42 and timer circuit 52. Upon receipt of the instruction, light source control circuit 42 reduces the luminance level of LED light source 35 to the normal luminance level. On the other hand, timer circuit 52, upon receipt of the instruction, stops accumulation of count (Step 6 in FIG. 8). However, when input detection circuit 51 again detects that a key input operation has occurred in operating portion 21 before the integrated value of timer circuit 52 reaches the predetermined value (Step 3 in FIG. 8), CPU 40 resets the integrated value of timer circuit 52 (Step 4 in FIG. 8). Accordingly, while inputs are repeated within a predetermined time, the luminance level of LED light source 35 is maintained at a higher level than usual. Alternatively, LED light source 35 may be controlled to turn power on/power off instead of controlling the luminance level of LED light source 35 or in addition to the luminance level control.

The invention claimed is:

1. A cellular phone comprising a first housing which incorporates a liquid crystal unit including a light source and a liquid crystal panel illuminated by light emitted from said light source, and a second housing which incorporates an input device, where said first housing and said second housing are coupled together for displacement relative to each other,
   wherein said first housing comprises a slit communicating with the interior and exterior of said first housing, and light guide means for guiding light emitted from said light source to said slit, and
   an operating portion of said input device disposed in said second housing is illuminated by light guided by said light guide means and emitted to the outside of said first housing through said slit,
   wherein said liquid crystal unit comprises:
      a frame which contains said light source;
      a diffusion plate for diffusing light emitted from said light source;
      a first reflective sheet for reflecting light diffused by said diffusion plate toward said liquid crystal panel; and
      a second reflective sheet for reflecting the light diffused by said diffusion plate toward an opening formed on said frame,
      wherein said opening formed at a position opposite to said slit, and
      said diffusion plate, said first reflective sheet, and said second reflective sheet are contained in said frame.

2. The cellular phone according to claim 1, wherein:
   said diffusion plate is laminated on said first reflective sheet,
   said liquid crystal panel is laminated on said diffusion plate;
   said second reflective sheet is disposed between a second side wall of said frame opposite to a first side wall of said frame formed with said opening, and a side surface of said diffusion plate opposite to said second side wall, and said light source is disposed between a third side wall which intersects with said first side wall and said second side wall of said frame, and a side surface of said diffusion plate opposite to said third side wall.

3. The cellular phone according to claim 1, comprising first control means for changing luminance level of said light source in accordance with a displacement state of said first housing and said second housing.

4. The cellular phone according to claim 1, comprising second control means for changing the luminance level of said light source when said operating portion is manipulated.

5. The cellular phone according to claim 1, comprising first control means for changing luminance level of said light source in accordance with a displacement state of said first housing and said second housing, wherein said first housing and said second housing can be changed to a closed state where said operating portion disposed on said second housing is covered with said first housing, and to an open state where said operating portion is exposed, and said first control means increases the luminance level of said light source in the open state from that in the closed state.

6. The cellular phone according to claim 1, comprising first control means for changing luminance level of said light source in accordance with a displacement state of said first housing and said second housing, and second control means for changing the luminance level of said light source when said operating portion is manipulated, wherein said first housing and said second housing can be changed to a closed state where said operating portion disposed on said second housing is covered with said first housing, and to an open state where said operating portion is exposed, said first control means increases the luminance level of said light source in the open state from that in the closed state, and said second control means increases the luminance level of said light source when said operating portion is manipulated, from the luminance level before said operating portion is manipulated.

7. The cellular phone according to claim 1, comprising first control means for changing luminance level of said light source in accordance with a displacement state of said first housing and said second housing, and second control means for changing the luminance level of said light source when said operating portion is manipulated, wherein said first housing and said second housing can be changed to a closed state where said operating portion disposed on said second housing is covered with said first housing, and to an open state where said operating portion is exposed, said first control means increases the luminance level of said light source in the open state from that in the closed state, said second control means increases the luminance level of said light source when said operating portion is manipulated, from the luminance level before said operating portion is manipulated, and said second control means restores the luminance level of said light source to the luminance level before said operating portion is manipulated if said operating portion is not manipulated again in a predetermined time after the luminance level of said light source has been increased.

* * * * *